US012377777B2

(12) United States Patent
Mason et al.

(10) Patent No.: US 12,377,777 B2
(45) Date of Patent: Aug. 5, 2025

(54) VEHICLE STATE-BASED LIGHT PROJECTION COMMUNICATION SYSTEM

(71) Applicant: The Regents of the University of Michigan, Ann Arbor, MI (US)

(72) Inventors: Brian Mason, Ann Arbor, MI (US); Sridhar Lakshmanan, Belleville, MI (US); Pam McAuslan, LaSalle (CA); Marie Waung, West Bloomfield, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 18/375,959

(22) Filed: Oct. 2, 2023

(65) Prior Publication Data
US 2024/0109478 A1    Apr. 4, 2024

Related U.S. Application Data

(60) Provisional application No. 63/412,470, filed on Oct. 2, 2022.

(51) Int. Cl.
*B60Q 1/50* (2006.01)
*B60Q 1/00* (2006.01)

(52) U.S. Cl.
CPC ........... *B60Q 1/507* (2022.05); *B60Q 1/0023* (2013.01); *B60Q 1/5037* (2022.05); *B60Q 1/545* (2022.05)

(58) Field of Classification Search
CPC ...... B60Q 1/507; B60Q 1/5037; B60Q 1/545; B60Q 1/0023; B60Q 1/543; B60Q 1/2603
See application file for complete search history.

(56) References Cited

U.S. PATENT DOCUMENTS

| 9,475,422 | B2 | 10/2016 | Hillis | |
|---|---|---|---|---|
| 9,902,311 | B2 | 2/2018 | Sweeney | |
| 9,953,538 | B1* | 4/2018 | Matthiesen | B60Q 1/346 |
| 9,969,326 | B2* | 5/2018 | Ross | B60Q 5/005 |
| 10,647,248 | B2 | 5/2020 | Kunii | |
| 10,650,675 | B2* | 5/2020 | Saito | B60Q 1/547 |
| 10,794,719 | B2 | 10/2020 | Kunii | |
| 10,816,939 | B1 | 10/2020 | Coleman | |
| 10,857,939 | B2* | 12/2020 | Morimura | B60Q 1/442 |

(Continued)

OTHER PUBLICATIONS

Deb et al., "Investigating Pedestrian Suggestions for External Features on Fully Autonomous Vehicles: A Virtual Reality Experiment." Transportation Research Part F: Traffic Psychology and Behaviour, Pergamon, 12 Sep. 2018, https://www.sciencedirect.com/science/article/abs/pii/S1369847818303474.

(Continued)

*Primary Examiner* — Robert J May
(74) *Attorney, Agent, or Firm* — Reising Ethington P.C.

(57) ABSTRACT

A light projection system and method for use in communicating intent of an automated system to a user. The light projection system includes a light projector for projecting light onto a surface adjacent to the light projection system; and a controller for controlling the light projected by the light projector. The controller is configured to, in response to a vehicle state or a traffic state, cause the light to be projected by the light projector so that the light impinges the surface and is reflected as a displayed graphic conveying an intent based on the vehicle state or the traffic state.

17 Claims, 12 Drawing Sheets

(56) References Cited

U.S. PATENT DOCUMENTS

| | | | |
|---|---|---|---|
| 10,913,389 B2* | 2/2021 | Aust | B60Q 1/0035 |
| 11,059,602 B1 | 7/2021 | Ross | |
| 11,318,879 B2* | 5/2022 | Fukutaka | B60Q 9/008 |
| 11,345,277 B2* | 5/2022 | Lujan | B60Q 5/006 |
| 2017/0028902 A1 | 2/2017 | Diaz | |
| 2017/0166111 A1 | 6/2017 | Baccarin et al. | |
| 2019/0118705 A1* | 4/2019 | Yu | G05D 1/0088 |
| 2019/0235635 A1 | 8/2019 | Hillis et al. | |
| 2020/0114813 A1 | 4/2020 | Lujan et al. | |
| 2020/0223352 A1* | 7/2020 | Toshio Kimura | B60Q 1/547 |
| 2020/0317119 A1* | 10/2020 | Huang | B60Q 5/006 |
| 2021/0197712 A1* | 7/2021 | Korjus | B60P 3/007 |

OTHER PUBLICATIONS

Wang et al. "Pedestrian Interaction with Automated Vehicles at Uncontrolled Intersections." Transportation Research Part F: Traffic Psychology and Behaviour, Pergamon, Jan. 10, 2021, https://www.sciencedirect.com/science/article/abs/pii/S1369847820305908.

Lagström et al., "[PDF] AVIP—Autonomous Vehicles' Interaction with Pedestrians—an Investigation of Pedestrian-Driver Communication and Development of a Vehicle External Interface: Semantic Scholar." Undefined, Jan. 1, 2015, https://www.semanticscholar.org/paper/AVIP-Autonomous-vehicles%27-interaction-with-An-of-of-Lagstr%C3%B6m-Lundgren/9f0e64783dea8330b6fca6acc8a90d89a8a03f56.

Zang et al., "Evaluating the Understandability of Light Patterns and Pictograms for Autonomous Vehicle-to-Pedestrian Communication Functions," in IEEE Transactions on Intelligent Transportation Systems, https://doi.org/10.1109/TITS.2022.3165881.

Harding et al. "Vehicle-to-Vehicle Communications : Readiness of V2V Technology for Application." Rosa P, United States. National Highway Traffic Safety Administration, Aug. 1, 2014, https://rosap.ntl.bts.gov/view/dot/27999.

Yang et al., "Effects of Exterior Lighting System of Parked Vehicles on the Behaviors of Cyclists," in IEEE Transactions on Intelligent Transportation Systems, https://doi.org/10.1109/TITS.2021.3114431.

Prattico et al., "Comparing State-of-the-Art and Emerging Augmented Reality Interfaces for Autonomous Vehicle-to-Pedestrian Communication," in IEEE Transactions on Vehicular Technology, vol. 70, No. 2, pp. 1157-1168, Feb. 2021, https://doi.org/10.1109/TVT.2021.3054312.

Eisma et al., "External Human-Machine Interfaces: The Effect of Display Location on Crossing Intentions and Eye Movements", Information 2020, 11, 13. https://doi.org/10.3390/info11010013.

* cited by examiner

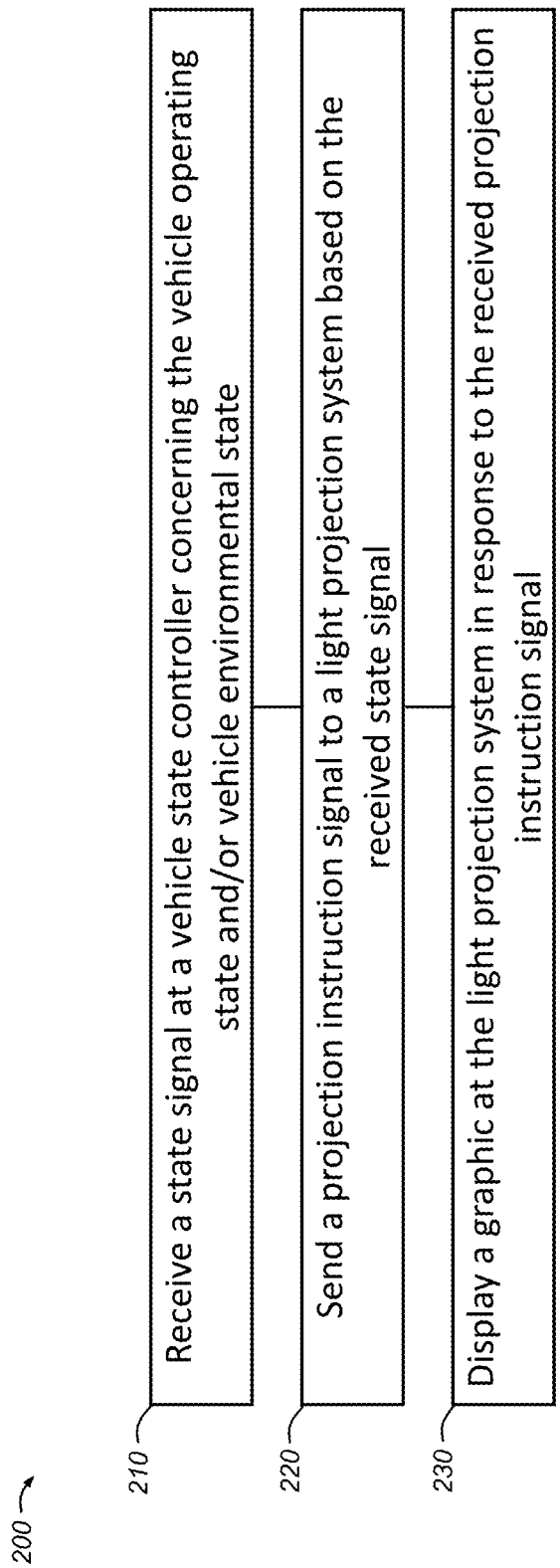

Infrastructure Reverse Warning Projection Behavior

VEHICLE STATE-BASED LIGHT PROJECTION COMMUNICATION SYSTEM

TECHNICAL FIELD

The present disclosure relates to vehicle communication and, more particularly, light-based vehicle communication.

BACKGROUND

Communication between driver and pedestrian is important in cross walks, parking lots, and other areas where knowledge of vehicle intent is important to pedestrian safety. Pedestrian understanding of driver intent is important to pedestrian safety on the road, in parking lots, and nearby areas where vehicles may be operated. With the development of autonomous vehicles (AVs), the human driver will be removed or at least less engaged, and with this, the exchange that occurs between drivers and pedestrians (e.g., head nods, hand gestures) will be lessened, if not lost.

SUMMARY

In accordance with an aspect of the disclosure, there is provided a light projection system for use in communicating intent of an automated system to a user. The light projection system includes: a light projector for projecting light onto a surface adjacent to the light projection system; and a controller for controlling the light projected by the light projector. The controller is configured to, in response to a vehicle state or a traffic state, cause the light to be projected by the light projector so that the light impinges the surface and is reflected as a displayed graphic conveying an intent based on the vehicle state or the traffic state.

According to various embodiments, this light projection system may further include any one of the following features or any technically-feasible combination of some or all of these features:

- the automated system is roadside equipment;
- the automated system is an autonomous vehicle (AV);
- the controller of the light projection system is configured to receive a projection instruction signal from a vehicle state controller of the vehicle;
- the vehicle state controller of the vehicle is an AV controller that determines an autonomous maneuver or action of the vehicle;
- the projection instruction signal indicates a vehicle state, and wherein the vehicle state is a vehicle operating state and/or a vehicle environmental state;
- the vehicle state is determined using an onboard vehicle sensor;
- the projection instruction signal indicates a predetermined graphic to be displayed as the displayed graphic;
- the predetermined graphic is selected from a set of predetermined graphics based on a vehicle state obtained from the vehicle state controller;
- the light projector is a high-powered light projector;
- the light projector is a very-high-powered light projector;
- the light projector is a high-powered light emitting diode (LED) array device having an array of high-powered LEDs;
- the high-powered LED array device is mounted to the vehicle so that, when light is emitted from the high-powered LED array device, light impinges a ground plane thereby rendering a graphic that is perceivable by a pedestrian;
- the traffic state indicates a state of pedestrian traffic and/or a state of vehicle traffic nearby the light projection system;
- the state of pedestrian traffic is determined by a motion detector installed at a road intersection where the motion detector faces a sidewalk or a crosswalk;
- the light projection system is configured so that the light is projected in response to detection of a pedestrian using the motion detector, and wherein the displayed graphic is selected based on a vehicle state of a nearby vehicle;
- the vehicle state is communicated from the vehicle to roadside equipment that is a part of and/or connected to the light projector system;
- the light projection system is configured to project the light while providing an audible alarm as a part of a multi-sensory alert; and/or
- the light projection system is configured to update the projected light in response to updated sensor data, and wherein the update to the projected light includes modifying a color, position, or orientation of a graphic based on the updated sensor data.

BRIEF DESCRIPTION OF THE DRAWINGS

Preferred exemplary embodiments will hereinafter be described in conjunction with the appended drawings, wherein like designations denote like elements, and wherein:

FIG. 2 is a flowchart of a method of displaying a graphic at a light projection system based on a vehicle state of a vehicle, according to one embodiment;

FIGS. 6A-6B illustrate a light projection system, particularly a light projector, in an off state (FIG. 6A) and an on state (FIG. 6B), according to one embodiment;

DETAILED DESCRIPTION

The system and method described herein enables communicating an intent of an automated device (e.g., a vehicle) through projecting light (in the form of graphics and/or textual messages) onto ground adjacent to or nearby the automated device. At least in some embodiments, the automated device is a vehicle, such as an autonomous vehicle (AV), that has a light projection device having a light projector and controller that is configured to control light projected by the light projector. The controller may be communicatively coupled to another device, such as a vehicle state controller that obtains a vehicle state, and may control the projected light based on information received from the vehicle state controller, such as a projection instruction signal that is generated based on the vehicle state and that causes the light projection device to project the light onto the ground, such as on the ground behind the vehicle when the vehicle is in reverse. The light may be in the shape of an object, such as an octagon thereby taking the form of a stop sign and informing a pedestrian to stop while the vehicle reverses. In other embodiments, colored light projectors, which may be formed of a high-powered metal halide lamp, a halogen bulb, or an array of light emitting diodes (LEDs), for example, may be used to display various graphics and/or designs.

It has been discovered that the elderly are at particular risk of being struck by reversing cars in parking lots (and other vehicle/traffic accidences) due to slower reaction time and in many cases hearing impairment. A link has been identified between the downward gaze of the elderly pedestrian, the increased likelihood of the elderly pedestrian to be struck by a reversing, parking lot safety, and the potential for Vehicle-to-Pedestrian (V2P) messages on the ground plane. According to embodiments, the light projection system and method herein is proposed as a solution that may be employed for visually warning individuals of vehicle states and/or other traffic conditions, such as the presence of pedestrians. For example, the light projection system may be used where a parked autonomous car could use advanced lighting technology (e.g., a high-powered LED array light projector) to project an image on the ground behind it when shifted or placed into reverse. It was found that elderly pedestrians are significantly more likely to detect a projected message on the ground than they are to detect the existing brake light when walking in a parking lot. By increasing detection of and decreasing reaction time to reversing cars, safety of elderly pedestrians in parking lots is increased. Of course, the disclosed system and method find further applicability in other, related scenarios involving communication between vehicles and pedestrians, or even other entities beyond pedestrians.

Figure 1:
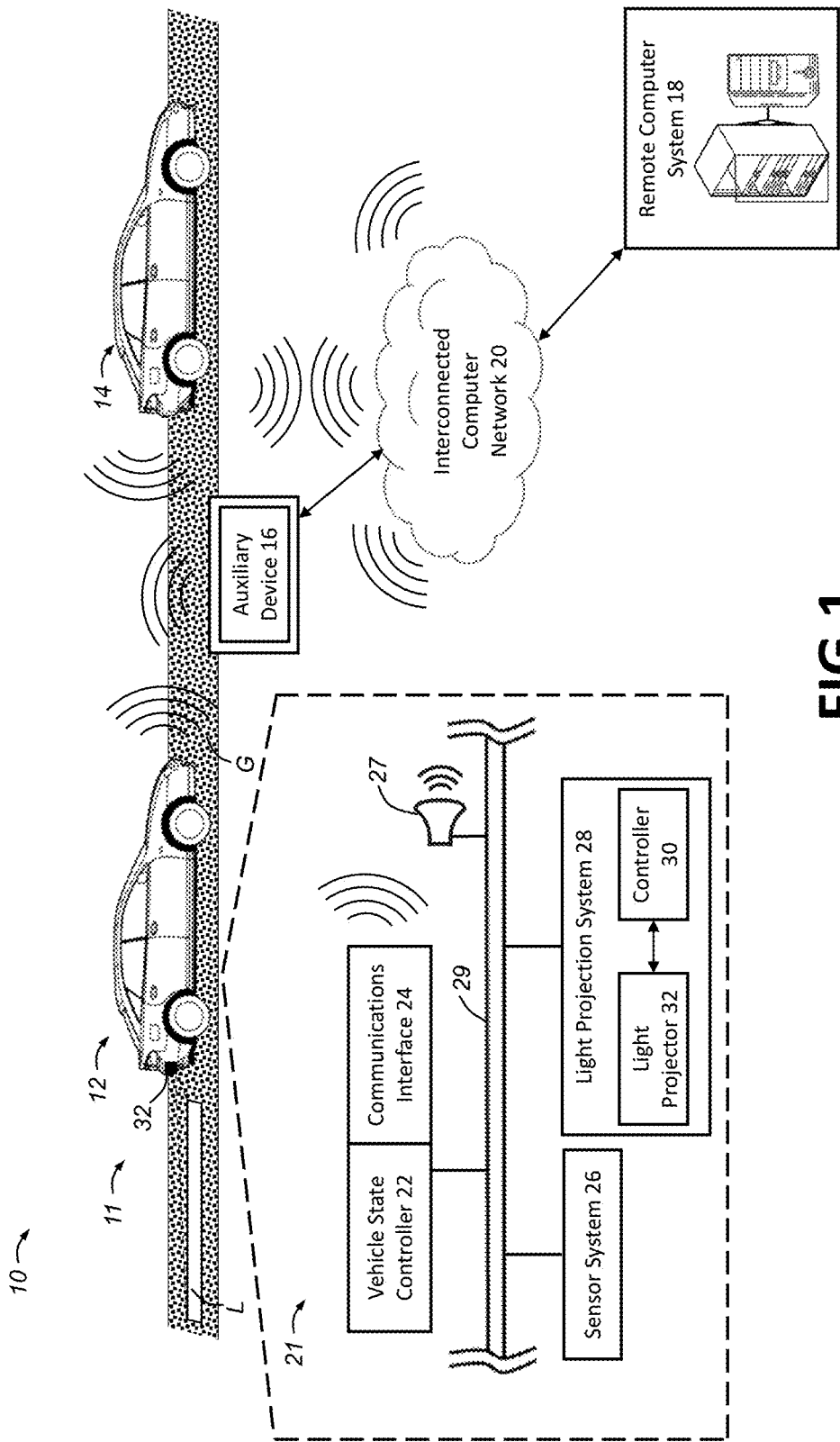
FIG. 1 depicts a communications system that includes a light projection system that is used to project light onto a surface proximate the vehicle, such as the ground, according to one embodiment.

With reference to FIG. 1, there is shown a communications system 10 having a light projection system 11, a first vehicle 12, a second vehicle 14, an auxiliary device 16, a remote computer system 18, and an interconnected computer network 20. The first vehicle 12 is shown as including vehicle electronics 21 having a vehicle state controller 22, a communications interface 24, a sensor system 26, an audio speaker 27, and a light projection device 28. The light projection system 11 includes the light projection device 28 and may include other portions of the vehicle electronics 21 and/or the communication system 10. The light projection device 28 is used to project light L onto the ground G adjacent the first vehicle 12. According to embodiments, the second vehicle 14 includes the same vehicle electronics as the vehicle electronics 21 of the first vehicle 12. According to other embodiments, the second vehicle 14 may omit one or more of these components of the vehicle electronics 21, such as the light projection device 28, for example.

The auxiliary device 16 is an electronic device that has a communications interface (not shown), which may be or include a wired communications interface(s) and/or wireless communications interface(s), such as those short- and long-range communications interfaces discussed below in connection with the communications interface 24; in the illustrated embodiment of FIG. 1, the auxiliary device 16 is shown as being roadside equipment (RSE) that includes SRWC capabilities, such as for purposes of communications with the vehicles 12, 14, and includes a wired connection to the interconnected computer network 20; of course, according to some embodiments, the auxiliary device 16 includes only a single communications interface and/or other communication interfacing configurations. In embodiments, the auxiliary device 16 may include a sensor that captures information about the environment and/or an operating state of the auxiliary device 16; in such embodiments, sensor data from the sensor may be communicated from the auxiliary device 16 to the first vehicle 12 for use in the method discussed herein. In embodiments, the auxiliary device 16 includes a light projection system that is used to project light and that is similar to the light projection device 28 of the vehicle electronics 21, which is discussed more below. The discussion of the light projection device 28 of the vehicle electronics 21 below is hereby incorporated and attributed to the auxiliary device 16 to the extent the discussion is not inconsistent with other express discussion herein of the light projection system of the auxiliary device 16. In one embodiment, the auxiliary device 16 is a roadside edge unit that includes a pedestrian sensor and that obtains sensor data from the pedestrian sensor. In another embodiment, the auxiliary device 16 is a streetlight adjacent an intersection and includes a light projection system that projects graphics onto ground at the intersection so as to be perceivable by pedestrians. Of course, these are but a few examples.

The remote computer system 18 may be any computer system that is located remotely from the first vehicle 12 and the second vehicle 14. The remote computer system 18 includes one or more processors and memory having remote computer operations that are accessible by the one or more processors. The one or more processors of the remote computer system 18 may be implemented using one or more computers or other computing devices, which may be distributed or co-located. The remote computer system 18 is used to send data to the first vehicle 12 and/or to receive data from the first vehicle 12. In embodiments, the remote computer system 18 is used to send predetermined graphics to the first vehicle 12, which may be used by the light projection device 28, such as for purposes of projecting the graphics onto a ground surface surrounding the vehicle.

The vehicle electronics 21 are shown and described as including certain components, but it will be appreciated that, according to embodiments, the vehicle electronics 21 may include other components and, in certain embodiments, may omit certain components. The vehicle state controller 22 is used to provide vehicle state information to the light projection device 28. The vehicle state information may be vehicle operating state information (i.e., information indication a vehicle operating state) and/or vehicle environmental state information (i.e., information indication a vehicle environmental state). The vehicle operating state indicates a state of operation of the vehicle, such as, for example, a current vehicle engine speed or state of charge of a propulsion battery. The vehicle environmental state indicates a state of the vehicle's environment, such as, for example, presence of precipitation (e.g., rain, snow), presence of other nearby vehicles or other objects (e.g., pedestrians), traffic signal information, etc. Of course, it will be appreciated that these operation states and environmental states are only exemplary and that the system may be adapted for use with various different vehicle operation state information and/or vehicle environmental state information.

The vehicle electronics 21 includes the vehicle state controller 22, the communications interface 24, the sensor system 26, the audio speaker 27, the light projection device 28, and a communications bus 29 that is used to communicatively couple components of the vehicle electronics 21. The communications bus 29 is illustrated as a hardwired communications bus, which may be a controller area network (CAN), a media oriented system transfer (MOST), a local interconnection network (LIN), or a local area network (LAN), to name a few potential options. In some embodiments, the communications bus 29 is implemented using wireless communication interfaces, such through use of Wi-Fi™, Bluetooth™, or other SRWC. The communications bus 29 is used for intra-vehicle communications between components of the vehicle electronics 21 whereas the communications interface 24 is used for communications with external devices, such as the second vehicle 14, the auxiliary device 16, the remote computer system 18, and/or the interconnected computer network 20.

According to embodiments, the vehicle state controller 22 includes one or more processors and memory storing vehicle state controller computer instructions that, when executed by the processor(s) of the vehicle state controller 22, cause vehicle state controller operations to be carried out. In embodiments, the vehicle state controller operations include one or more steps of method 200 (FIG. 2) described below. In one embodiment, the vehicle state controller 22 is or forms a part of one or more of the following: a body control module (BCM), an engine control module (ECM), a traction control module (TCM), an infotainment head unit, autonomous vehicle (AV) controller (in the case where the first vehicle 12 is an AV), or other onboard vehicle computer having one or more processors and memory storing instructions that are executable by the processor(s). The AV controller may be an AV controller that determines an autonomous maneuver or action of the vehicle, such as to carry out a vehicle change lane maneuver or an action to increase vehicle acceleration. In one embodiment, which is discussed more below, the vehicle state controller 22 is integrated with the light projection device 28. In embodiments, the integrated vehicle state/projection system controller may be used to obtain vehicle state information by obtaining data from the communications bus 29, such as through listening for different signals being placed onto the communications bus 29.

The communications interface 24 is used to carry out communications with other devices, such as other vehicles and/or devices on interconnected computer networks, such as the internet. The communications interface 24 may include a dedicated short-range communications (DSRC) circuitry and/or user equipment for cellular communications and/or other long-range, wireless communications. The DSRC circuitry may be used to carry out short-range wireless communications (SRWC), such as any of the IEEE 802.11 protocols (e.g., IEEE 802.11p, Wi-Fi™), WiMAX™, ZigBee™, Z-Wave™, Wi-Fi Direct™, Bluetooth™ (e.g., Bluetooth™ Low Energy (BLE)), or near field communication (NFC). The SRWC circuitry may be used for vehicle-to-vehicle (V2V) communications, vehicle-to-infrastructure (V2I) communications, and/or other vehicle communications (vehicle-to-everything (V2X)). In some embodiments, the communications interface 24 is used to transmit vehicle state messages (i.e., electronic messages having vehicle state information) to other nearby devices, such as the second vehicle 14 and/or the auxiliary device 16, which may be roadside equipment (RSE), for example. The user equipment may be or include a cellular chipset (or other long-range transceiver hardware) used for communications with a cell tower, for example, which then connects the user equipment to an end device, which may be the remote computer system 18, for example, or another vehicle, such as the second vehicle 14.

The sensor system 26 includes at least one sensor, which may be any of a variety of sensors used by the vehicle to obtain a vehicle operation state and/or a vehicle environmental state. The sensor system 26 may include, for example, a wheel speed sensor, a steering wheel angle sensor, a motion detection sensor, a presence sensor, a camera, a thermometer, etc. The sensor system 26 captures sensor data and sends sensor data to the vehicle state controller 22.

The audio speaker 27 is an electronically-controlled speaker that is mounted on the first vehicle 12 and is shown as being connected to the communications bus 29; however, it will be appreciated that, according to embodiments, the audio speaker 27 may be connected to other components or modules, such as an infotainment module and/or the vehicle state controller 22, for example. The audio speaker 27 is used to provide audio output so that a passenger of the vehicle and/or a nearby pedestrian is able to hear the audio outputted by the audio speaker 27. The audio speaker 27 may be used for presenting audible text/words and/or a variety of noises and other sounds, such as a warning buzzer or bell, for example.

The light projection device 28 includes a controller 30 and a light projector 32 that projects light L onto a surface, namely (at least in some embodiments) a ground surface of the ground G on which the vehicle is disposed. The controller 30 is used to control projection of light by the light projector 32. According to embodiments, the controller 30 includes one or more processors and memory storing projector controller computer instructions that, when executed by the processor(s) of the controller 30, cause projector controller operations to be carried out. In at least one embodiment, the light projection device 28 may include an OSRAM EVIYOS™ lighting system, which comprises a configurable grid array of 1024 high intensity LEDs used as the light projector 32. The light projector 32 may be comprised of different light projecting technology, and may use, for example and according to embodiments, a metal halide lamp, a halogen bulb, or an array of light emitting diodes (LEDs). In the present embodiment, the high-intensity LED array, which is used as the light projector 32, may be configured to generate one or more projectable patterns (which will be discussed in greater detail below) and, in embodiments, uses an array of high-powered LEDs. In embodiments, the light projector 32 may be a high-powered light projector or a very-high-powered light projector. As used herein, a high-powered light projector is one that outputs at least 2,500 lumens and a very-high-powered light projector is one that outputs at least 5,000 lumens. According to embodiments, various other types of light projectors and devices incorporating the same may be used as the light projector 32 and the light projection device 28, respectively.

In one embodiment, the light projector system 28 (or at least the light projector 32) is incorporated into a light module of the vehicle, such as one into a module having one or more of a vehicle headlight, taillight, fog light, reverse light, trunk light, stop light, parking light, and/or a turn signal light. For example, as shown in FIG. 1, the light projector system 28 is incorporated into the taillight module of the first vehicle 12 and is configured to project light L toward the ground G adjacent to the first vehicle 12 and, in the particular example of FIG. 1, directly behind the first vehicle 12. The light projector 32 may be included within a light housing (which may be at least semi-transparent) and that may also include vehicle light(s), such as any one or more of those listed above.

With reference to FIG. 2, there is shown a method 200 of displaying a graphic at a light projection system based on a vehicle state of a vehicle. In embodiments, the method 200 is carried out by the first vehicle 12, such as through use of the vehicle state controller 22 and/or the controller 30 of the light projection device 28.

The method 200 begins with step 210, wherein a state signal is received at the vehicle state controller 22. In at least some embodiments, the state signal is a vehicle state signal that indicates the vehicle operating state and/or the vehicle environmental state, which may be sensor data received from the sensor system 26. In one embodiment, for example, the sensor system 26 sends sensor data indicating presence of an individual to the vehicle state controller 22; in embodiments, this sensor data constitutes the state signal. In another embodiment, sensor data from another device, such as from the second vehicle 14 and/or the auxiliary device 16, is received as the state signal. In other embodiments, the state signal is a traffic state signal that indicates a state of road traffic and/or pedestrian traffic and/or presence thereof, such as the presence of pedestrians within particular regions or zones. The method 200 continues to step 220.

In step 220, a projection instruction signal is sent to the light projection device 28 based on the state signal received at the vehicle state controller 22. The projection instruction signal is a signal that causes a light projection system to project light. In embodiments, the projection instruction signal indicates a predetermined graphic or information used to obtain and/or generate a graphic, which is then displayed using the light projection device 28. In some embodiments, the graphic to be displayed by the light projection signal is sent from the vehicle state controller 22 to the light projection device 28; in other embodiments, the light projection device 28 includes information indicating the vehicle state (e.g., vehicle is in reverse gear, vehicle is reversing, object detected by left-rear proximity sensor of vehicle) and/or a particular predetermined graphic. The light projection device 28 using the controller 30 then determines the graphic to be displayed using the light projector 32. The method 200 continues to step 230.

In step 230, a graphic is displayed at the light projection device 28 in response to the received projection instruction signal. In some embodiments, the graphic is a predetermined graphic and, in one embodiment, the graphic is a selected predetermined graphic that is selected from a set or collection of predetermined graphics that are stored in memory of the vehicle electronics 21, such as in memory of the vehicle state controller 22 or in memory of the light projection device 28. In other embodiments, the graphic is generated based on the state signal, such as based on camera information. For example, the graphic may include colors that are modified (e.g., the hue is modified) based on the state signal, such as based on a vehicle speed (e.g., the graphic color is red if the vehicle is going fast and yellow if the vehicle is going slow). In some embodiments, the graphic is generated based on the state signal, but also includes portions that are predetermined, such as text ("STOP" or "YIELD") being colored based on the state signal; it will be appreciated that this is just one example, as many different graphics and adaptations may be used. In one embodiment, a multi-sensory alert is issued, which refers to an alert that is interpreted using multiple senses; for example, in one embodiment, the multi-sensory alert includes projecting light using the light projection device 28 and playing an audible sound using the audio speaker 27. In other embodiments, other human-machine interfaces (HMIs) may be used to alert an individual, such as a pedestrian. The method 200 ends.

According to one embodiment, the method 200 is used to carry out a synchronized vehicle state-projected light process in which light projected by a light projection system is modified over time based on presently-received sensor data and/or vehicle operation data, such as wheel speed. For example, the step 210 may include receiving wheel speed sensor data and step 230 may include display a graphic based on the wheel speed sensor data; furthermore, in embodiments, the method includes carrying out the step 210 again to determine updated wheel speed sensor data and then carrying out a step of modifying the light projected by the light projection system based on the updated wheel speed sensor data. Of course, in other embodiments, this method may be adapted for use with other sensor data and/or vehicle states, which may be triggered based on the vehicle state meeting certain condition(s).

FIGS. 3A-3F, 4, and 5A-5B illustrate embodiments based on the communication system and method described above. These embodiments are similar in many respects to the embodiments shown in FIG. 1 and FIG. 2 and like numerals between the embodiments generally designate like or corresponding elements throughout the several views of the drawings. Accordingly, the descriptions of the embodiments are hereby incorporated into one another, and description of subject matter common to the embodiments generally may not be repeated.

FIGS. 3A-3F show various illustrative embodiments of a light projection system 328A-F being mounted or otherwise attached to various locations on a vehicle. It will be appreciated that each light projection system 328A-F each includes a light projection device corresponding to the light projection device 28 discussed above and that discussion is hereby attributed to each light projection system 328A-F to the extent such discussion is not inconsistent with the express discussion of the respective light projection system 328A-F. In embodiments, one or more of the light projection systems 328A-F is a multi-light projection system having two or more light projectors (each corresponding to the light projector 32) and a common controller (corresponding to the controller 30) that controls projection of light by the two or more light projectors. And, in embodiments, one or more of the light projection systems 328A-F is an aggregated light projection system having two or more light projectors (each corresponding to the light projector 32) and two or more controllers, where each controller is used to control a different one of the two or more light projectors; in such embodiments, the controllers may communicate with one another so as to coordinate projection of light and/or may each receive instructions from a central controller, such as a projection instruction signal from the vehicle state controller 22 (where the vehicle state controller 22 is the central controller in such an embodiment, for example). In embodiments, the aggregated light projection system is comprised of two or more light projection systems, each of which corresponds to the light projection device 28, for example. And, in some embodiments, the two or more light projection systems of the aggregated light projection system are each a multi-light projection system.

Figure 3C:
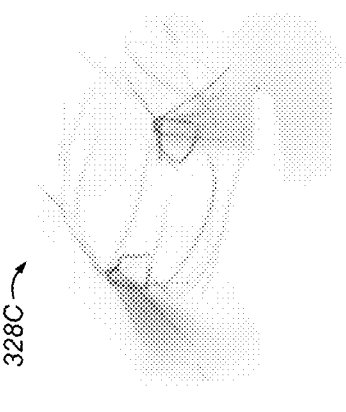
FIGS. 3A-F each is an illustration depicting a light projection system incorporated into different devices of a vehicle or auxiliary device, according to embodiments.
Figure 3B:
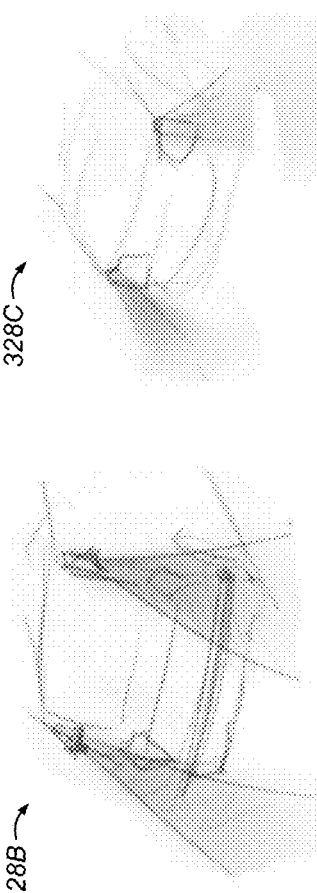
Figure 3A:
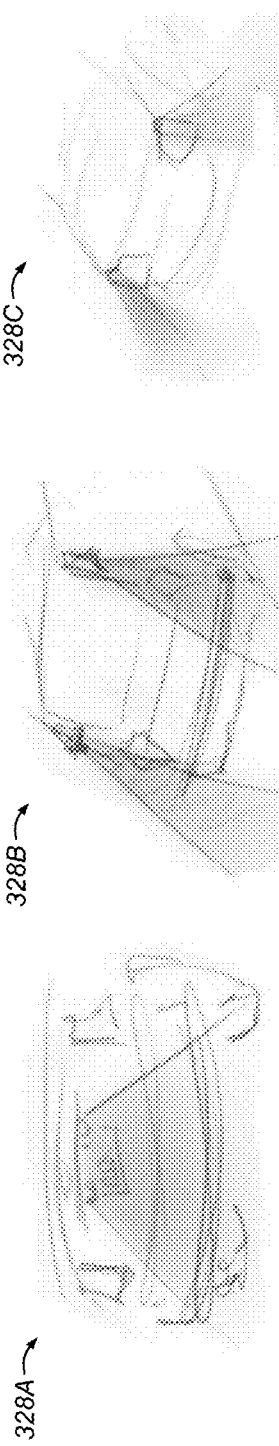

In FIG. 3A, a light projection system 328A (or at least a light projector thereof) is shown mounted on the trunk of a vehicle near a region for a license plate and is configured to project light onto the ground behind the vehicle, such as is shown in FIG. 1. In such an embodiment, the light projector of the light projection system 328A may be incorporated into a license plate light module, which is a module having a light and housing surrounding and protecting the light and that is configured to illuminate a license plate of the vehicle; in such embodiments, for example, the light projection system 328A is incorporated into the housing of the license plate light module.

In FIG. 3B, a light projection system 328B (or at least two light projectors thereof) is shown mounted on an upper portion of a C-pillar of a vehicle. More particularly, two light projectors are shown, with one on each C-pillar of the vehicle and configured to direct light downwardly at the ground surface of the ground behind the vehicle. Such light projectors may be housed in a taillight module (or other light module) on the rear of the vehicle, or may be separately housed with a housing have a semi-transparent (or entirely transparent) wall through which light is projected by the light projectors of the light projector system 328B. In one embodiment, the light projection system 328B is an aggregated light projection system; in another embodiment, the light projection system 328B is a multi-light projection system with two light projectors that project light onto non-overlapping areas of the ground (although some light may overlap partially, in some embodiments), for example.

In FIG. 3C, a light projection system 328C (or at least two light projectors thereof) is shown as an integral part of a headlight assembly. More particularly, two light projectors are shown, with one housed within a separate headlight module of the vehicle and configured to direct light downwardly at the ground surface of the ground in front of the vehicle. In one embodiment, the light projection system 328C is an aggregated light projection system; in another embodiment, the light projection system 328C is a multi-light projection system with its two light projectors controlled by a controller that causes light to be projected onto non-overlapping areas of the ground. Although, it will be appreciated that, in other embodiments, light may be projected in an overlapping manner, such as where increased lumens is required due to ambient luminance, such as where it is very sunny and bright.

Figure 3F:
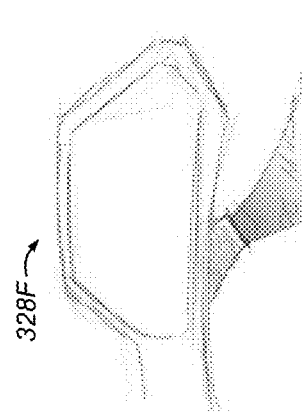
Figure 3E:
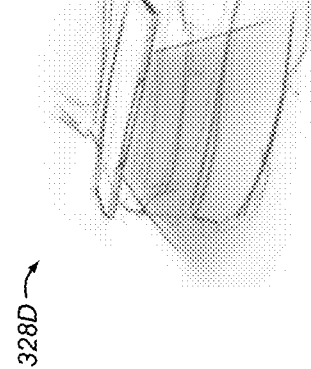
Figure 3D:
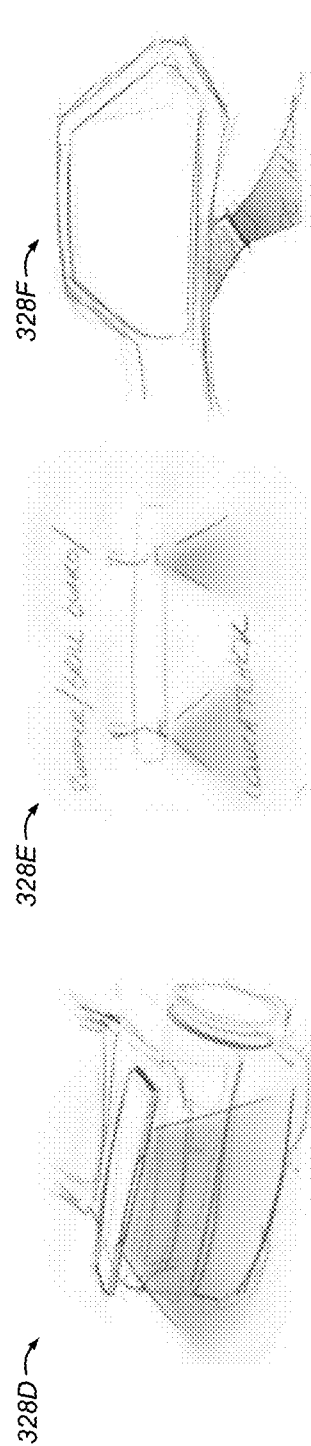

In FIG. 3D, a light projection system 328D (or at least a light projector thereof) is shown integrated in a portion of a trunk lid. In this embodiment, the light projection system 328D (or at least a light projector thereof) is positioned within a portion of the vehicle's spoiler. In such an embodiment, the light projector of the light projection system 328D is an elongated light projector in that the ratio of width to height of light array emitter elements is greater than 5; for example, a two-dimensional array of lights having one hundred light array emitter elements (e.g., LEDs, emitter ends of a 2D waveguide emitter array) by five light array emitter elements has a ratio of 20 and is considered an elongated light projected.

In FIG. 3E, a light projection system 328E (or at least two light projectors thereof) is shown mounted on a portion of the bumper, such as on the underside of the bumper and facing downwardly at an angle so as to project light onto the ground behind the vehicle. The light projectors of the light projection system 328E may be attached to a grill guard.

In FIG. 3F, a light projection system 328F (or at least a light projector thereof) is shown mounted on the underside of a mirror. The light projector of the light projection system 328F is housed within housing of the sideview mirror, as shown in FIG. 3F, and further is angled so as to direct light projected by the light projector of the light projection system 328F toward the ground on the right side of the vehicle. It will be appreciated that the other side mirror (the left side mirror) may include a light projector situated in the same manner so as to project light toward the ground of the left side of the vehicle.

One of ordinary skill in the art will recognize that the vehicles, or portions thereof, are shown merely schematically and may be of any suitable shape, size, and configuration to cooperate with at least a portion of the light projection system 328A-F. Additionally, one of ordinary skill will appreciate the light projection system is not limited to being positioned or integrated on the exterior of the vehicle.

Figure 4:
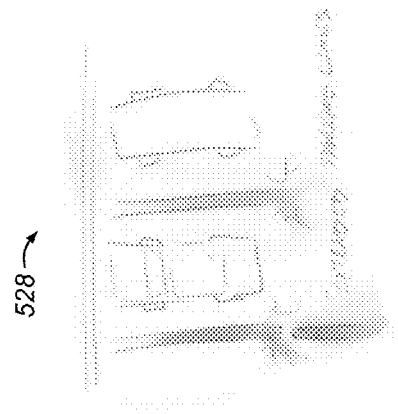
FIG. 4 is an illustration depicting a light projection system incorporated into a streetlight, according to one embodiment.

In FIG. 4, another embodiment is shown and includes a streetlight 416 comprising a light projection system 428 having at least one light projector as shown in FIG. 4. The streetlight 416 corresponds to the auxiliary device 16 includes a light projection system that is similar to the light projection device 28 of the vehicle electronics 21; that discussion of the light projection device 28 is hereby attributed to the light projection system 428 to the extent that discussion is not inconsistent with the express teachings of the light projection system 428. As shown in FIG. 4, the light projector of the light projection system 428 is incorporated into housing of a light of the streetlight 416, and this light projector is separate than the light used for illuminating the street. In embodiments, the auxiliary device 416 may be configured to receive municipal traffic information (e.g., status of a traffic light or of a walk sign) and may also be equipped with sensors. In the event that traffic is traveling across a crosswalk and it is not an appropriate time for a pedestrian to enter the crosswalk, the light projection system 428 (or a controller of the light projection module) may receive a projection instruction signal from the auxiliary device 416 indicating that traffic currently has the right of way to enter the crosswalk. Based on the signal received, an appropriate graphic may be selected and displayed on or near the entrance of the crosswalk. On the other hand, the light projection system 428 may receive a projection instruction signal from a controller of the auxiliary device 416, and the projection instruction signal may indicate, for example, that a pedestrian is in the vicinity of the crosswalk and has the right of way to enter the crosswalk. Upon receiving such signal, the projection system 428 may select and display a graphic near the entrance or in a portion of the crosswalk indicating it is an appropriate time for the pedestrian to enter the crosswalk. The aforementioned examples are two common scenarios involving vehicles and pedestrians, but those of ordinary skill in the art will appreciate many other vehicle and/or pedestrian scenarios where projecting graphics would also be advantageous (e.g., roundabouts, bus stops, bike lanes, traffic notifications, oncoming emergency vehicle).

Figure 5A:
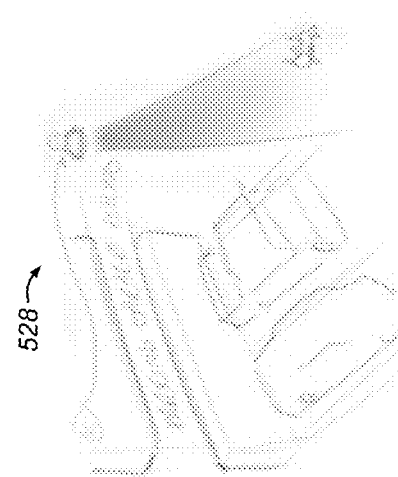
FIGS. 5A-5B are illustrations depicting a light projection system incorporated into a ceiling or overhead portion of a parking garage, according to one embodiment.
Figure 5B:
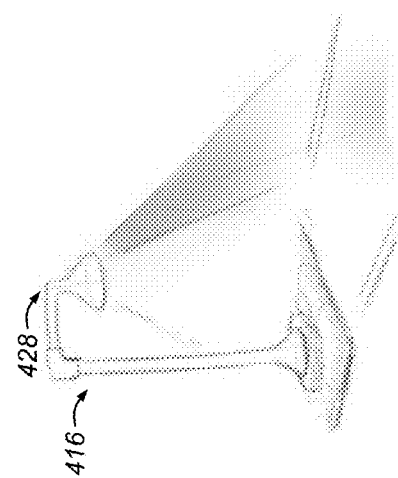

With reference to FIGS. 5A and 5B, an illustrative embodiment is shown including a light projection system 528 being integrated with a parking structure. In FIG. 5A, the light projection system (or at least a light projector thereof) 528 is shown being mounted on the ceiling of the parking structure. The projection system 528 may be integrated with an auxiliary device 516 that has or is connected to sensors and that may be configured to receive vehicle operating state and/or vehicle environmental state signals. In practice, the auxiliary device 516 may send one or more projection instructions signals to the light projection system 528, which can in turn select and display graphics on various locations throughout of the parking structure surrounding. For example, when a vehicle is pulling into a parking spot, the light projection module of the light projection system 528 may receive a projection instruction signal from the vehicle and/or a controller of the auxiliary device 516 based on a detected distance between the vehicle's front bumper and the wall; in such an exemplary scenario, the light projection system 528 may, in response to receiving the projection instruction signal, display a graphic for communicating (to a person or other visual perception system in the area) whether the vehicle should continue to proceed or stop. In another example where a vehicle is traveling in the parking structure and the vehicle or auxiliary device 516 senses pedestrians in the vicinity of the vehicle, the projection system 528 may receive projection instruction signal(s) and respond accordingly. In yet another example, and with reference to FIG. 5B, the projection system 528 may be able receive a projection instruction signal which indicates a parking spot is empty and displays extended parking lines to help improve visibility for oncoming vehicles and/or to indicate the parking spot is vacant.

With reference to FIGS. 6A-6B, there are shown images of a vehicle having a light projection system that is used to project light onto the ground and, specifically, FIG. 6A depicts the light projection system in an off state in which no light is projected from the light projector and FIG. 6B depicts the light projection system in an on state in which light is projected from the light projector. In particular, in FIG. 6B, the light is projected into an octagon or stop-sign shape. More specifically, as shown in FIG. 6B, the projected light forms an octagon shape whereby the projected light forms an octagon-shaped region in which no light from the light projector is impinging the ground. Of course, various different shapes, colors, and/or other characteristics of the projected light may be used and adapted for the application in which the light projection system is to be used.

With reference to FIGS. 7-10C, there are shown various exemplary embodiments of a light projection system incorporated into a vehicle. According to embodiments, the vehicle depicted in FIGS. 7-10C is the first vehicle 12 and the light projected by the vehicle in FIGS. 7-10C is projected by the light projection device 28.

Figure 7:
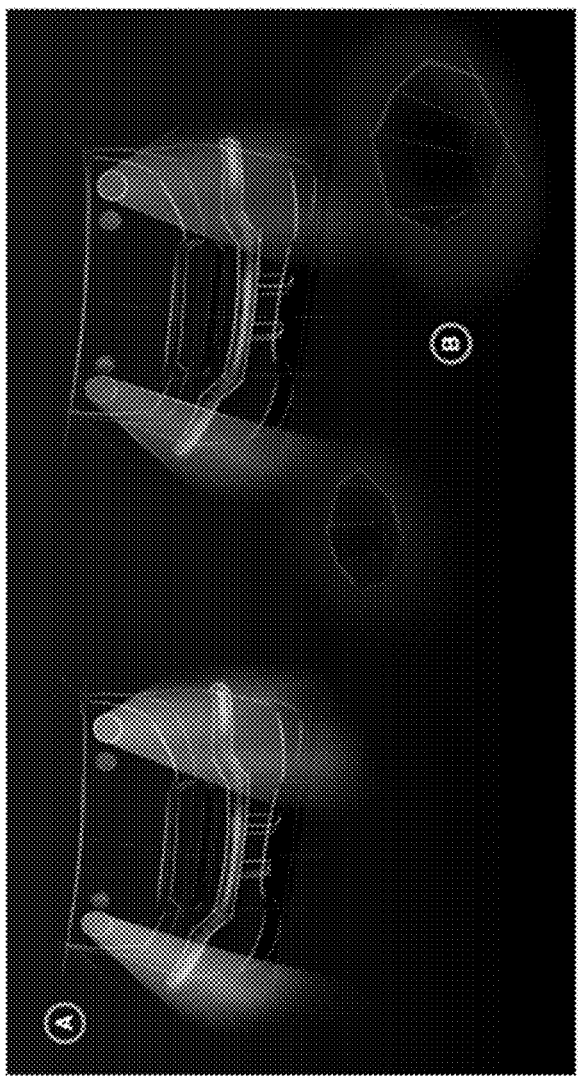
FIG. 7 is an illustration of a light projection system incorporated into a light module of a vehicle, according to one embodiment.

In FIG. 7, there is shown a first illustration (A) and a second illustration (B) showing a light projection system that projects octagons (or stop-sign shapes) onto the ground. In one particular embodiment, such as is illustrated in FIG. 7, the light projection system is incorporated into a vehicle light module that projects ambient or diffuse (omnidirectional) light for illumination.

Figure 8A:
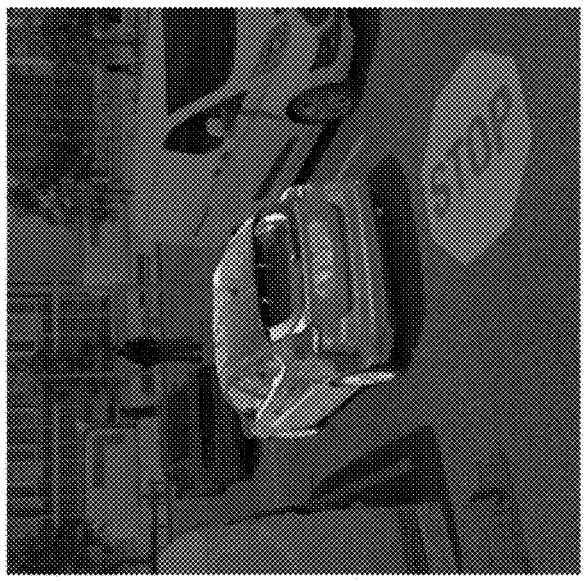
FIGS. 8A-8C are perspective views of a rear side of a vehicle with a light projection system projecting a stop graphic onto the ground behind the vehicle, according to embodiments.
Figure 8B:
Figure 8C:

In FIGS. 8A-8C, there are shown different graphics that may be displayed by the light projection system, including a large stop sign with text facing to the side (FIG. 8A) or rearward (FIG. 8B) and a dual display portion graphic having two distinct areas for displaying a graphic (FIG. 8C). In embodiments, the graphics of FIGS. 8A-C are generated using a multi-light projection system and/or an aggregated light projection system.

Figure 9A:
FIGS. 9A-9B are perspective views of a rear side of a vehicle with a light projection system projecting a directional graphic onto the ground behind the vehicle, according to embodiments.
Figure 9B:

In FIGS. 9A-9B, there are shown different graphics that may be displayed by the light projection system, including an arrow pointing in the direction that the vehicle intends to travel (FIG. 9A) and a dual display portion graphic having two distinct areas indicating an intending vehicle path (FIG. 9B).

Figure 10C:
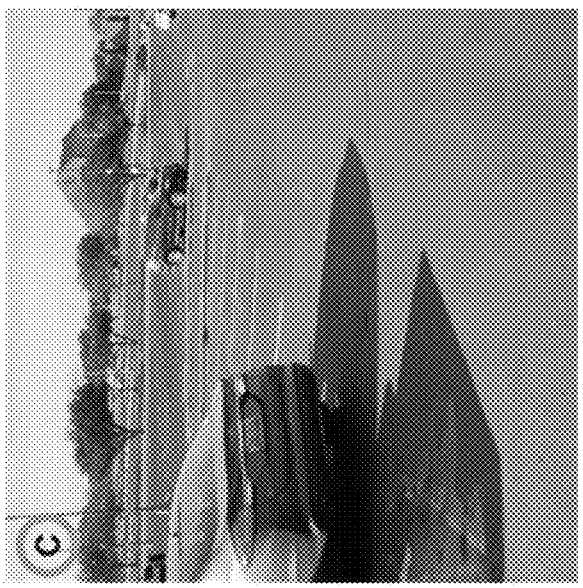
FIGS. 10A-10C are perspective views of a rear side of a vehicle with a light projection system in an off state (FIG. 10A) and in an on state (FIGS. 10B-10C) projecting a stop graphic (FIG. 10B) and a directional graphic (FIG. 10C) onto the ground behind the vehicle, according to embodiment.
Figure 10B:
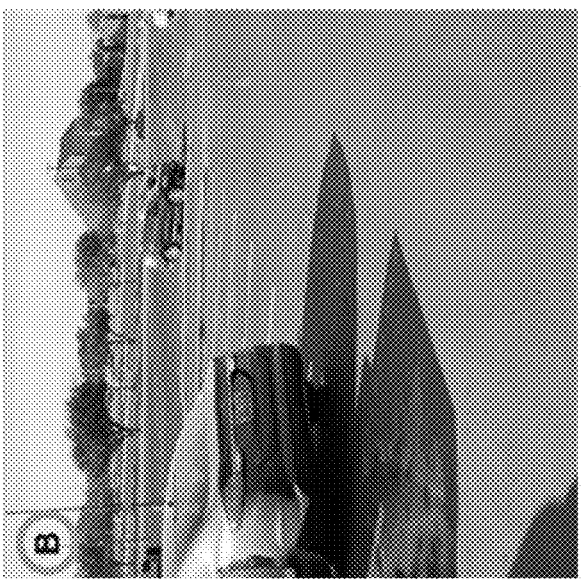
Figure 10A:
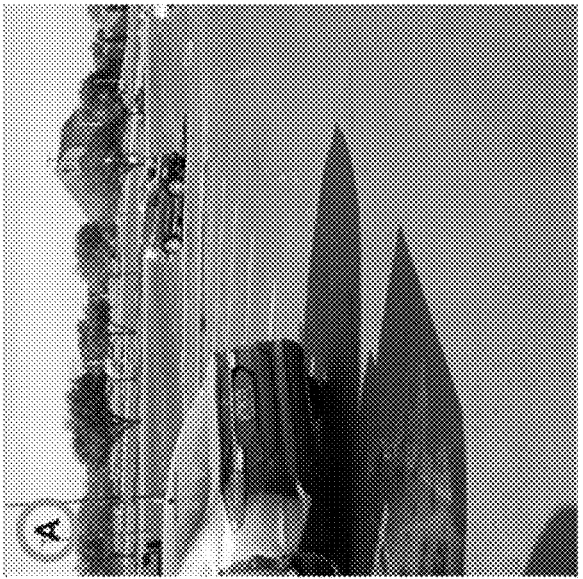

In FIGS. 10A-C, there are shown a rear portion of a vehicle and a ground surface located rearward of the vehicle onto which different graphics may be displayed by a light projection system. In particular, in FIG. 10B, the light projection system is projecting a dual display portion graphic having two display portions that each include a dotted or dashed lines (extending rearward from left and right sides of the vehicle) along with a stop sign and "STOP" text in the stop sign. In FIG. 10C, a dual display portion is used with the text "REVERSING" being used for each display portion; the graphic in FIG. 10C further includes an arrow pointing in the direction that the vehicle intends to travel, thereby conveying a vehicle intent.

Figure 12:
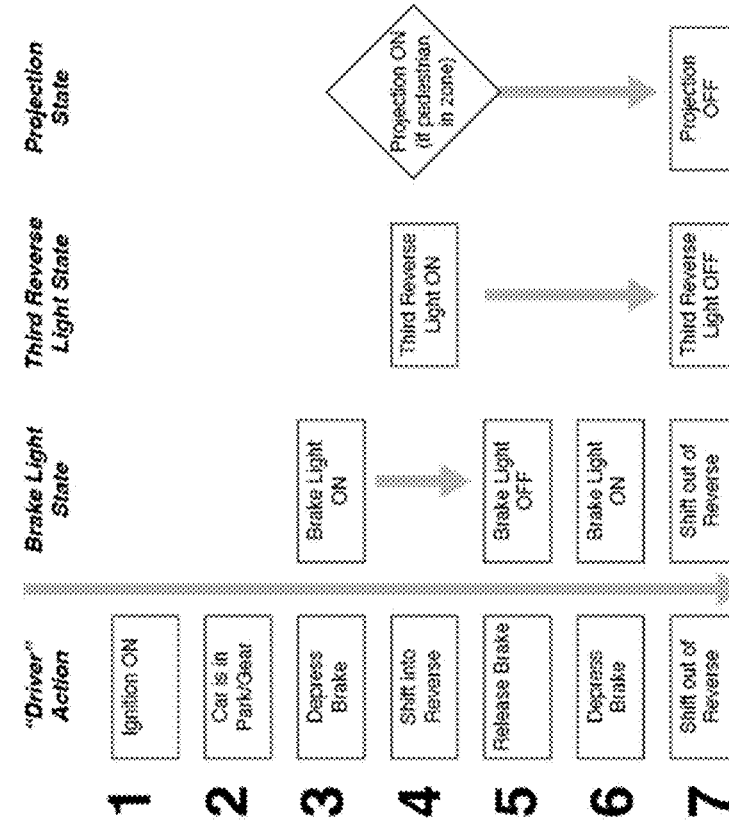
FIG. 12 is a state timing diagram showing states of various components of a vehicle and corresponding actions of a driver or operator, according to one embodiment.
Figure 11:
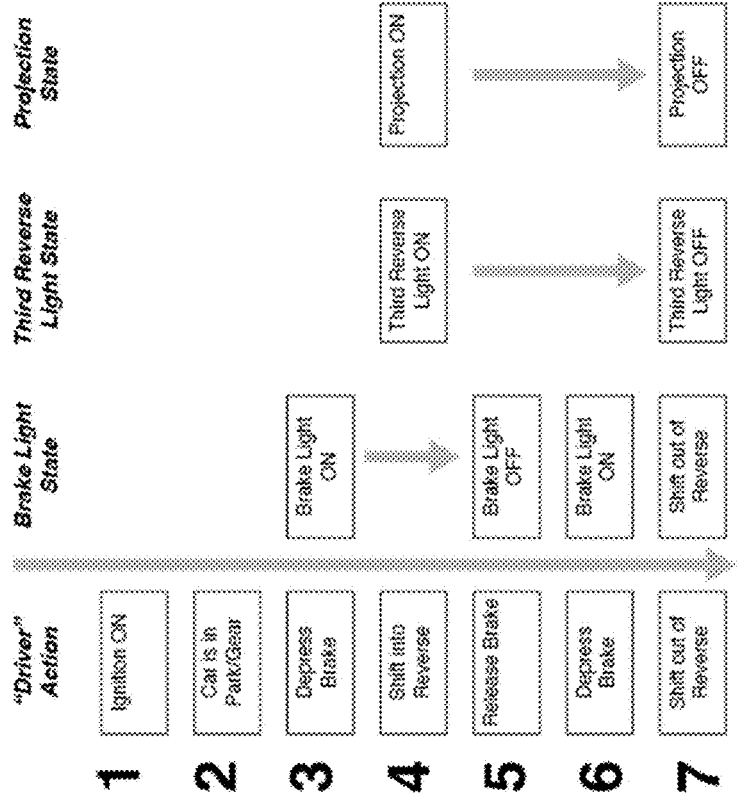
FIG. 11 is a state timing diagram showing states of various components of a vehicle and corresponding actions of a driver or operator, according to one embodiment.

FIGS. 11-12 each depicts a timing flow schematic in which a driver action is shown along with states of various lights of a vehicle and a "smart vehicle" (FIG. 12), which is a vehicle that projects light using the light projector in response to a detected vehicle state that is determined based on sensor data, such as when a pedestrian is detected in a particular region or zone adjacent or nearby the vehicle (e.g., directly behind the vehicle). As shown, the ignition begins on at time t=1, and then, at time t=2, the car is in a parking gear; at time t=3, a brake pedal is depressed and, in response, the brake light turns on; at time t=4, the vehicle is shifted into reverse and, in response, a reverse light (such as an ambient red light, for example) is turned on projected light is projected by a light projector of a light projection system (such as the light projection device 28); at time t=5, the brake pedal is released and, in response, the brake light turns off; at time t=6, the brake pedal is depressed and the brake light is turned on; and at time t=7, the vehicle is shifted out of reverse and the reverse light and the light projector are turned off. According to embodiments, a vehicle state controller, such as the vehicle state controller 22, may send signals to the various light systems of the vehicle, including the light projection system, so as to coordinate the projected light with the rest of the vehicle's operation and, in some embodiments, for example, with the vehicle's other ambient/illuminative lighting modules and systems.

Figure 13:
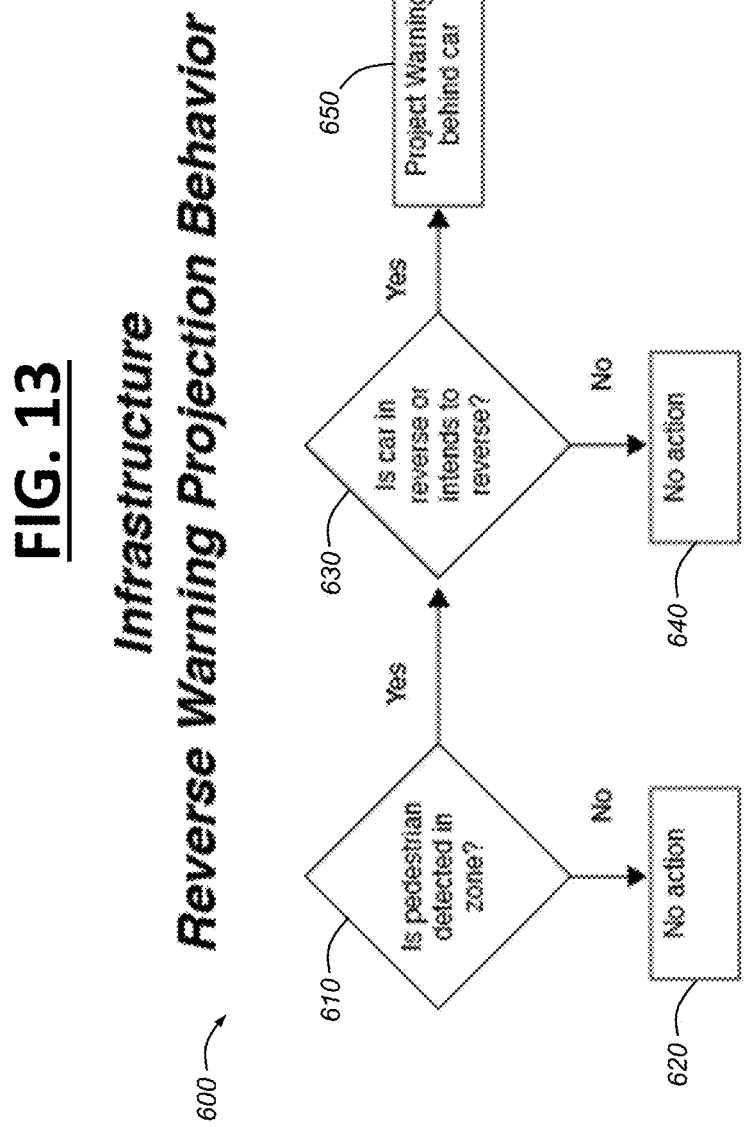
FIG. 13 is a flowchart of a method of projecting light onto a surface, according to one embodiment.

FIG. 13 depicts a flowchart of a method 600 of projecting light onto a surface. The method 600 may be carried out by a light projection system, such as by the light projection device 28. The method 600 begins with step 610, wherein it is determined whether a pedestrian is detected in a particular zone or region, such as a zone or region Z directly behind the first vehicle 12 as shown by the dashed lines in the example of FIG. 14A. In one embodiment, a motion sensor or presence sensor that is able to detect the presence of an individual or person in a given area is mounted on the first vehicle 12 and used to provide sensor data indicating the presence of an individual. In other embodiments, the motion detector or presence sensor may be mounted on a streetlight or roadside equipment adjacent the vehicle 12. When a person is detected in the zone Z, then the method continues to step 630; otherwise, the method 600 continues to step 620 and no action is taken.

In step 630, it is determined whether the first vehicle 12 is in reverse and/or whether the vehicle intends to reverse. In embodiments, it may be determined that the vehicle is in reverse through determining a current gear state is a reverse state. In other embodiments, the vehicle may anticipatorily determine that the vehicle is to reverse (or be placed into a reverse gear) soon or imminently. The method 600 continues to step 650 when it is determined that the vehicle is in reverse and/or whether the vehicle intends to reverse; otherwise, the method 600 continues to step 640 and no action is taken.

Figure 14A:
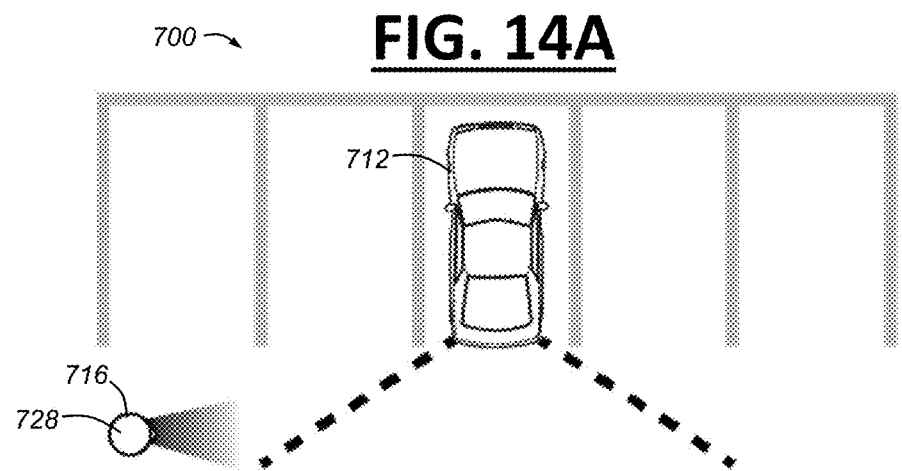
FIGS. 14A-14B are diagrammatic overhead plan views of a vehicle and a light projection system incorporated into a streetlight, according to one embodiment.
Figure 14B:
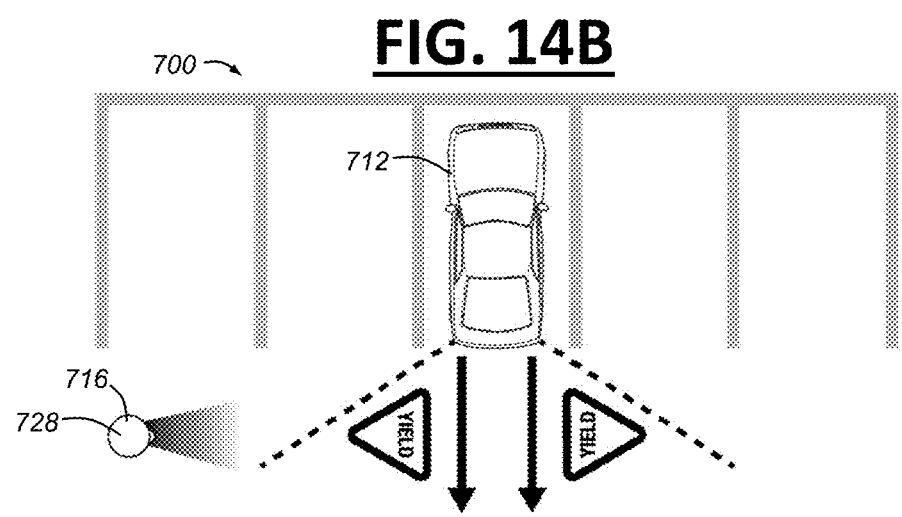

In step 650, a warning is projected behind the vehicle using the light projection system. This step is analogous to step 230 of the method 200 and that discussion is hereby attributed to this step 650 to the extent such discussion is not inconsistent with the express discussion of the step 650. In this step, for example, the warning may include graphical images and/or textual content, such as a stop sign with the text "STOP" or "YIELD". In one embodiment, the light projection system includes a light projection module that is mounted on an auxiliary device, such as a streetlight 716 (FIGS. 14A-14B). For example, with reference to FIGS. 14A-14B, there is shown a system 700 the first vehicle 12 with a zone Z defined in a tapered area or region behind the first vehicle 12. The system 700 includes a light projection module 728 that is mounted on a streetlight 716 in a parking lot. The light projection device 728 is used to project a graphic, such as a warning as shown in FIG. 14B, onto the ground. The method 600 then ends.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A light projection system for use in communicating intent of an automated system of a vehicle to a user comprising: a light projector mounted on a vehicle and configured for projecting light onto a surface behind the vehicle; and a controller for controlling the light projected by the light projector, wherein the controller is configured to cause the light projector to project light onto the surface behind the vehicle as a displayed graphic configured for alerting pedestrians behind the vehicle of the vehicle's intention in response to determination of a traffic state and of a vehicle state when at least one pedestrian is detected in a predetermined zone around the vehicle, and wherein the light projection system is configured to update the projected light in response to updated sensor data from a sensor on the vehicle.

2. The light projection system of claim 1, wherein the vehicle state indicates a state that the vehicle is in reverse or intending to be placed in reverse and wherein the traffic state indicates a state of pedestrian traffic or a state of vehicle traffic nearby the light projection system.

3. The light projection system of claim 2, wherein the state of pedestrian traffic is determined by a motion detector installed at a road intersection where the motion detector faces a sidewalk or a crosswalk.

4. The light projection system of claim 3, wherein the detection of a pedestrian is using the motion detector, and wherein the displayed graphic is selected based on a vehicle state of a nearby vehicle.

5. The light projection system of claim 4, wherein the vehicle state is communicated from the vehicle to roadside equipment that is a part of and/or connected to the light projector system.

6. The light projection system of claim 1, wherein the controller of the light projection system is configured to receive a projection instruction signal from a vehicle state controller of the vehicle.

7. The light projection system of claim 6, wherein the projection instruction signal indicates the vehicle state, and wherein the vehicle state includes a vehicle operating state and a vehicle environmental state.

8. The light projection system of claim 7, wherein the vehicle state is determined using an onboard vehicle sensor.

9. The light projection system of claim 6, wherein the projection instruction signal indicates a predetermined graphic to be displayed as the displayed graphic.

10. The light projection system of claim 9, wherein the predetermined graphic is selected from a set of predetermined graphics based on a vehicle state obtained from the vehicle state controller.

11. The light projection system of claim 6, wherein the vehicle state controller of the vehicle is an AV controller that determines an autonomous maneuver or action of the vehicle.

12. The light projection system of claim 1, wherein the light projector is a high-powered light projector.

13. The light projection system of claim 12, wherein the light projector is a high-powered light emitting diode (LED) array device having an array of high-powered LEDs.

14. The light projection system of claim 13, wherein the high-powered LED array device is mounted to the vehicle so that, when light is emitted from the high-powered LED array device, light impinges a ground plane thereby rendering a graphic that is perceivable by a pedestrian.

15. The light projection system of claim 12, wherein the light projector is a very-high-powered light projector.

16. The light projection system of claim 1, wherein the light projection system is configured to project the light while providing an audible alarm as a part of a multi-sensory alert.

17. The light projection system of claim 1, wherein the update to the projected light includes modifying a color, position, or orientation of a graphic based on the updated sensor data.

* * * * *